US011182116B2

(12) United States Patent
Okamoto

(10) Patent No.: US 11,182,116 B2
(45) Date of Patent: Nov. 23, 2021

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Akira Okamoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 146 days.

(21) Appl. No.: 16/365,687

(22) Filed: Mar. 27, 2019

(65) Prior Publication Data

US 2019/0303070 A1    Oct. 3, 2019

(30) Foreign Application Priority Data

Apr. 3, 2018    (JP) .............................. JP2018-071316

(51) Int. Cl.
| | | |
|---|---|---|
| *G06F 15/00* | (2006.01) | |
| *G06F 3/12* | (2006.01) | |
| *G06K 1/00* | (2006.01) | |
| *H04N 1/00* | (2006.01) | |

(52) U.S. Cl.
CPC .......... *G06F 3/1236* (2013.01); *G06F 3/1203* (2013.01); *G06F 3/1259* (2013.01); *H04N 1/00209* (2013.01); *H04N 2201/0094* (2013.01)

(58) Field of Classification Search
CPC .... G06F 3/1236; G06F 3/1203; G06F 3/1259; H04N 1/00209; H04N 2201/0094
USPC .............................. 358/1.1, 1.15, 1.14, 1.13
See application file for complete search history.

(56) References Cited

U.S. PATENT DOCUMENTS

| | | | |
|---|---|---|---|
| 8,718,078 B2 | 5/2014 | Ooba | |
| 2012/0201254 A1* | 8/2012 | Miyazaki | ................ H04L 12/12 370/419 |
| 2017/0310545 A1* | 10/2017 | Watanabe | ........... H04L 41/0816 |
| 2019/0281188 A1* | 9/2019 | Tanaka | .................... H04N 1/444 |
| 2019/0294391 A1* | 9/2019 | Ohara | .................. H04N 1/2376 |

FOREIGN PATENT DOCUMENTS

| | | |
|---|---|---|
| JP | 2013138284 | 7/2013 |
| JP | 5511332 | 6/2014 |

* cited by examiner

*Primary Examiner* — Douglas Q Tran
(74) *Attorney, Agent, or Firm* — JCIPRNET

(57) ABSTRACT

An information processing apparatus includes multiple network interfaces, a storage area that saves data, and a change controller. An attribute defining a network interface permitted as an output path of the saved data is associated with the storage area. The change controller controls a change of the attribute corresponding to a change instruction to change the attribute, in accordance with a state regarding presence/absence of data in the storage area at a time point of receiving the change instruction.

12 Claims, 10 Drawing Sheets

| NETWORK GROUP ID | NETWORK INTERFACE INFORMATION |
|---|---|
| GROUP 1 | LAN1 |
| GROUP 2 | LAN2 |
| GROUP 3 | Wi-Fi |
| GROUP 4 | NONE |
| GROUP 5 | LAN1/Wi-Fi |

| PATTERN ID | INPUT-PERMITTED PATH | OUTPUT-PERMITTED PATH |
|---|---|---|
| PATTERN 1 | LAN1/Wi-Fi | LAN1 |
| PATTERN 2 | LAN2 | LAN2 |
| PATTERN 3 | LAN1/LAN2/Wi-Fi | NONE |

| NETWORK GROUP ID | NETWORK INTERFACE INFORMATION | UNSPECIFIED CASE INFORMATION |
|---|---|---|
| GROUP 6 | LAN1/Wi-Fi | LAN1 |
| GROUP 7 | LAN2 | LAN2 |

| DOCUMENT ID | NETWORK INPUT FLAG | IMPORTANCE FLAG | ... |
|---|---|---|---|
| 000123 | ON (INPUT VIA NETWORK) | OFF (NOT IMPORTANT) | ... |
| 000246 | OFF (INPUT VIA OTHER THAN NETWORK) | ON (IMPORTANT) | ... |
| 00369 | OFF | ON (IMPORTANT) | ... |
| ⋮ | ⋮ | ⋮ | ... |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-071316 filed Apr. 3, 2018.

BACKGROUND

(i) Technical Field

The present disclosure relates to an information processing apparatus and a non-transitory computer readable medium.

(ii) Related Art

Among information processing apparatuses, there is a type that is capable of simultaneously connecting to a plurality of different networks via a plurality of network interfaces. In some cases, this type of information processing apparatus is connected to both a first network that handles highly confidential data and a second network that handles not so confidential data. For example, in the case where an information processing apparatus is an expensive apparatus such as a digital multifunctional peripheral, sharing this apparatus between the first network and the second network is advantageous in terms of cost. In such a case, a situation may occur in which data handled on the first network is once saved in a storage area in the information processing apparatus, and then the data is leaked from the storage area to the second network.

In a system disclosed in Japanese Patent No. 5511332, when a print control apparatus receives a job via any of a plurality of networks, the print control apparatus identifies the network via which the job has been received, adds information of the identified network as an attribute value to the job, and, at the time of saving the job in an image forming apparatus, stores the network information added as the attribute value of the job in a management table and manages the network information along with the job. In response to a request from a terminal apparatus to obtain data saved in a hard disk drive (HDD), the print control apparatus refers to the management table to add network information to the data, determines whether or not a transmission condition is satisfied on the basis of the network information and network information of the transmission destination, and transmits the data if the condition is satisfied.

Among information processing apparatuses, there is a type that is capable of simultaneously connecting to a plurality of different networks via a plurality of network interfaces. In some cases, this type of information processing apparatus is connected to both a first network that handles highly confidential data and a second network that handles not so confidential data. For example, in the case where an information processing apparatus is an expensive apparatus such as a digital multifunctional peripheral, sharing this apparatus between the first network and the second network is advantageous in terms of cost. In such a case, a situation may occur in which data handled on the first network is once saved in a storage area in the information processing apparatus, and then the data is leaked from the storage area to the second network. As one method of preventing such a situation, the following method is conceivable. In this method, a dedicated storage area for saving data from the first network is provided in the information processing apparatus. An attribute indicating that, as an output path of data in the storage area, a network interface for the first network is permitted but a network interface for the second network is not permitted is set to that storage area. In this method, even in response to an instruction to output data saved in the storage area via a network interface for the second network, that instruction is not executed under control that refers to the attribute.

In such a method, it may be sometimes necessary to change the above-mentioned attribute set to the storage area. However, unlimitedly permitting a change to the attribute may cause a situation where data that has been present in the storage area before the change is output via a network interface that has not been permitted in the case of the attribute before the change.

SUMMARY

Aspects of non-limiting embodiments of the present disclosure relate to preventing a situation where, due to a change of an attribute set to a storage area, data in the storage area is output via a network interface that has not been permitted in the case of the attribute before the change.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a plurality of network interfaces, a storage area that saves data, and a change controller. An attribute defining a network interface permitted as an output path of the saved data is associated with the storage area. The change controller controls a change of the attribute corresponding to a change instruction to change the attribute, in accordance with a state regarding presence/absence of data in the storage area at a time point of receiving the change instruction.

BRIEF DESCRIPTION OF THE DRAWINGS

An exemplary embodiment of the present disclosure will be described in detail based on the following figures, wherein.

DETAILED DESCRIPTION

Configuration of Apparatus

Figure 1:
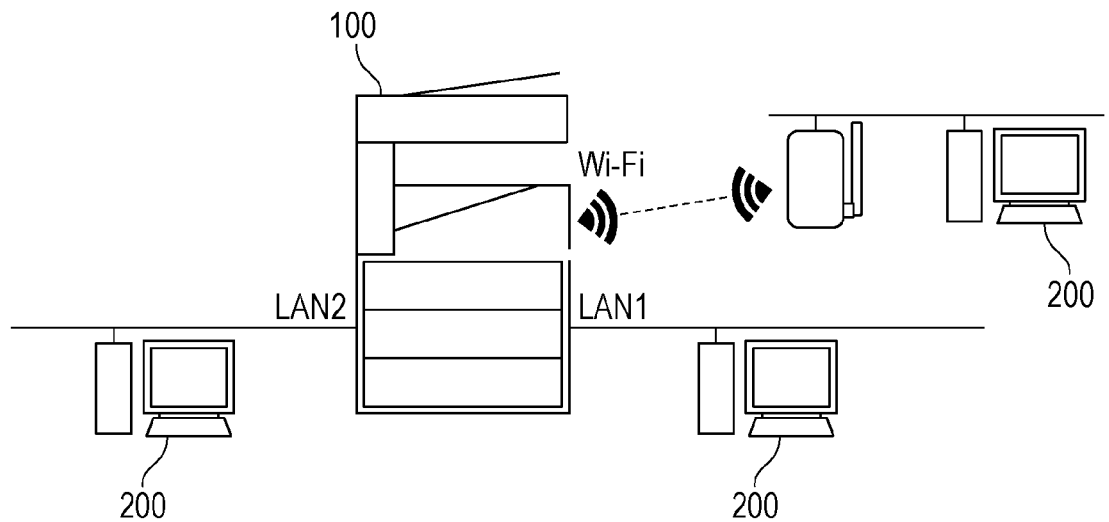
FIG. 1 is a diagram illustrating an example of a network environment where a multifunctional peripheral serving as an exemplary embodiment of an information processing apparatus according to the present disclosure is connected.

FIG. 1 is a diagram illustrating an example of a network environment where a multifunctional peripheral 100, serving as an exemplary embodiment of an information processing apparatus according to the present disclosure, is connected.

In this example, the multifunctional peripheral 100 includes three network interfaces, and is connected to three different networks, namely, local area network (LAN) 1, LAN 2, and Wi-Fi (registered trademark), via these network interfaces. A computer 200 such as a personal computer (PC) or a mobile terminal on each network communicates data with the multifunctional peripheral 100 via a network connected to the computer 200. Note that a multifunctional peripheral is an apparatus that has multiple functions such as a printer, a scanner, a copy machine, and a fax machine.

Figure 2:
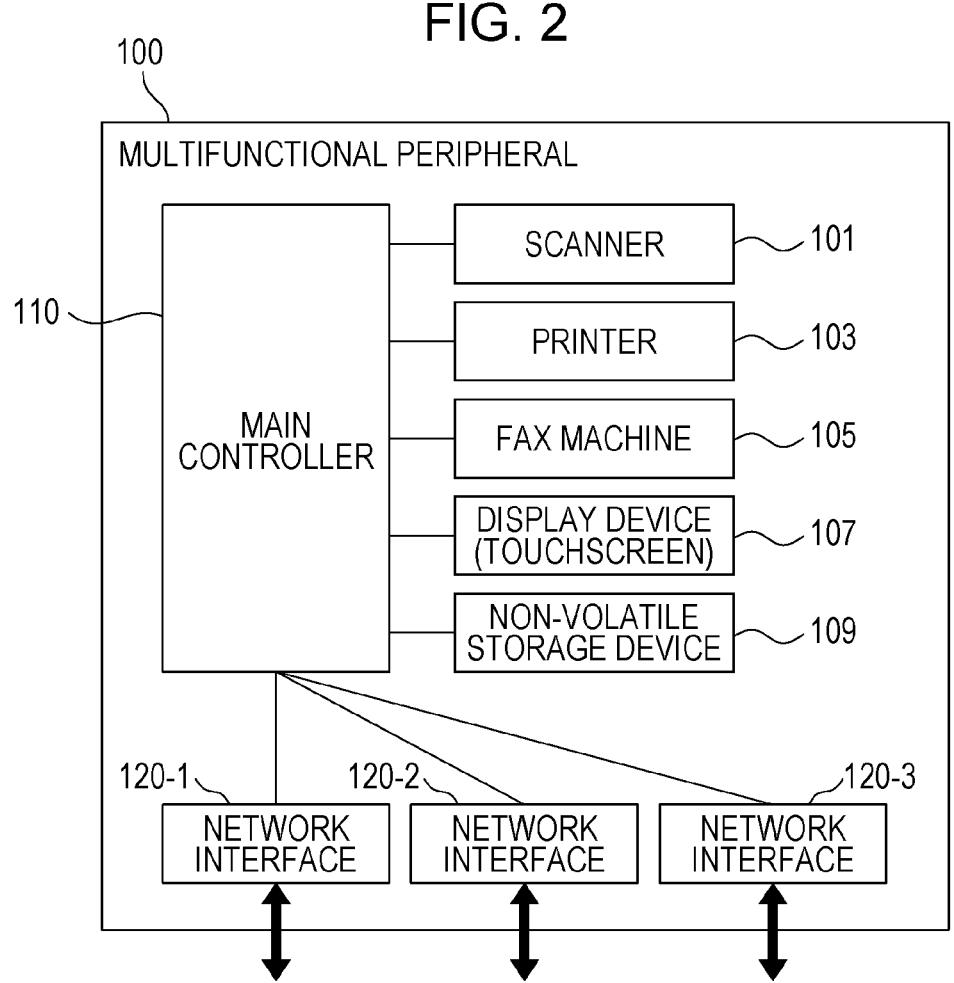
FIG. 2 is a diagram illustrating an example of the internal configuration of the multifunctional peripheral.

FIG. 2 illustrates an example of the internal configuration of the multifunctional peripheral 100. The multifunctional peripheral 100 includes a scanner 101, a printer 103, a fax machine 105, a display device 107, a non-volatile storage device 109, a main controller 110, and network interfaces 120-1, 120-2, and 120-3 (hereinafter collectively referred to as a "network interface 120" when it is unnecessary to distinguish them).

The scanner 101 optically reads an image of a document and generates image data representing that image. The printer 103 prints an image represented by image data on paper. Copying is realized by cooperation of the scanner 101 and the printer 103. The fax machine 105 transmits/receives faxes. The display device 107 is a device that displays a screen for a user interface (UI) of the multifunctional peripheral 100. In this example, the display device 107 is configured as a touchscreen-type device, and also serves as an input device (however, this is only one example). The non-volatile storage device 109 is a storage device that maintains its storage even when the power is turned off, and a hard disk drive (HDD) and flash memory are an example of the non-volatile storage device 109.

The main controller 110 is a unit that controls the operation of the multifunctional peripheral 100, and includes a computer that performs data processing and a control program executed by the computer. The main controller 110 receives input from a user to the UI screen displayed on the display device 107, and realizes, in response to this input, processing for which the instruction has been given by the user by controlling the scanner 101, the printer 103, the fax machine 105, or the like. In addition, the main controller 110 is connected to networks via the network interfaces 120-1, 120-2, and 120-3, and communicates instructions and data with computers on these networks. In the example illustrated in FIGS. 1 and 2, it is assumed that the network interface 120-1 is connected to LAN 1; the network interface 120-2 is connected to LAN 2; and the network interface 120-3 is connected to a network via Wi-Fi. For the sake of the following description, it is assumed that at least LAN 1 and LAN 2 are different networks in this example. In addition, it is assumed that a network to which the multifunctional peripheral 100 is connected via Wi-Fi is connected to LAN 1.

The multifunctional peripheral 100 has the function of saving image data, print data described in a page description language (PDL), and electronic document data such as files generated by various applications (hereinafter simply referred to as "documents") in the non-volatile storage device 109.

A plurality of storage areas for documents may be provided in the multifunctional peripheral 100. There is no particular restriction on a specific method of realizing a storage area. For example, each storage area may be a folder managed by a file system of the main controller 110, or may be a logic partition or a logic drive set to the non-volatile storage device 109. In addition, multiple non-volatile storage devices 109 (physical drives) may be provided in the multifunctional peripheral 100, and these physical drives may be individually defined as separate storage areas. In addition, these types of storage areas described by way of example may be combined for use. In the following description, each of these storage areas is referred to as a "box" in a figurative sense. To limit users who are permitted to access the individual boxes, a password may be set to each box, or each user's access authority to the individual boxes may be defined using an access control list.

The main controller 110 has the function of controlling input (storage and accumulation) and output (fetching) of a document to/from such a box.

A document (image data) generated by scanning performed by the scanner 101, a document received by the fax machine 105, and a document input via a network are saved in a box. A document saved in a box is output in modes such as print output from the printer 103, transmission using the fax machine 105, and transmission via a network.

The multifunctional peripheral 100 illustrated in the drawings is connected to a plurality of different networks. Security requirements may be different for each of these networks. For example, an example of such a case is the case where, in an office, a division that handles highly confidential data and a division that handles not so confidential data are differentiated to disable staff in the latter division from accessing highly confidential data via a network. Even in such a case, it may be difficult to install an expensive multifunctional peripheral 100 in each division, and one multifunctional peripheral 100 may be shared by a plurality of divisions. In such a case, the multifunctional peripheral 100 is connected to a network of a division with strict security requirements (referred to as a "first division" for the sake of convenience) and a network of a division that is not so strict with security requirements. To satisfy the security requirements of the former division, it is necessary to prepare a box (storage area) dedicated to the former division as a box in the multifunctional peripheral 100, and to prevent leakage of a document saved in this box to a network of the latter division.

For example, a network of the first division and a network of another division different from the first division may use the same network address as a private Internet protocol (IP) address. In such a case, it is unexecutable to restrict access to a box in the multifunctional peripheral 100 or restrict transfer of a document in the box using an IP address. As a countermeasure, for example, at the time of transmitting a document in a box, a user who gives an instruction to transfer the document simply specifies the network interface 120 via which the document is transmitted, thereby preventing leakage of the document in the box to an unexpected network. However, for general users, it is too much to ask to specify the network interface 120 via which a document is transmitted. It is not unlikely that the user is perplexed or makes wrong choices.

In the exemplary embodiment, a mechanism is provided that applies control to prevent leakage of a document saved in a box to a network that is not permitted in terms of security. Hereinafter, this mechanism will be described.

Figures 3, 4:
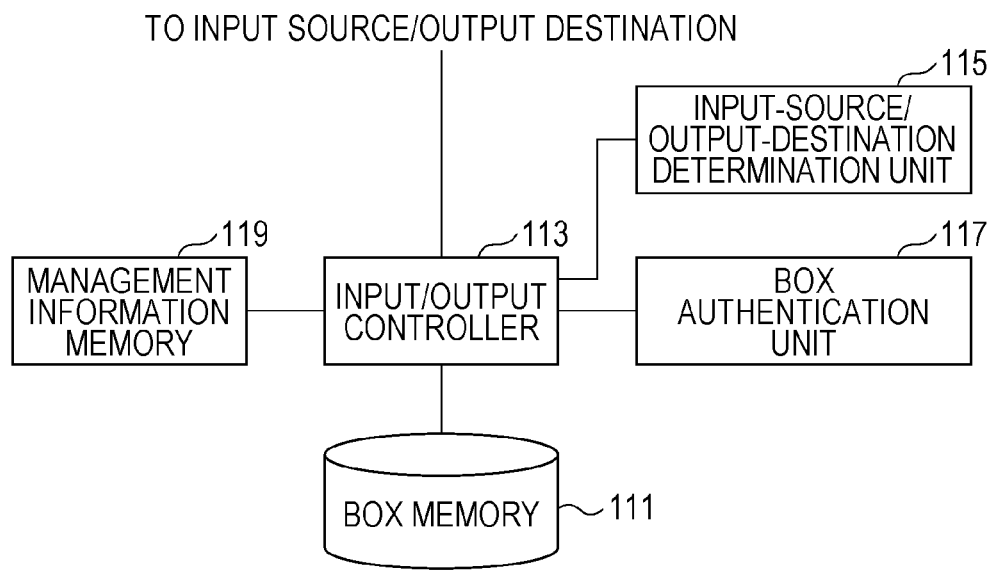
FIG. 3 is a diagram illustrating an example of a mechanism that applies control to prevent leakage of a document saved in a box to a network that is not permitted in terms of security.
FIG. 4 is a diagram illustrating an example of the data structure of input/output path access authority information.

FIG. 3 illustrates a group of functions that the main controller 110 has for this mechanism. A box memory 111 stores information on one or more boxes and information on a document(s) saved in each box. An input/output controller 113 controls input (saving) or output (transfer, print, etc.) of a document to/from the box memory 111.

An input-source/output-destination determination unit 115 determines the input source of inputting an operation instruction for a box or a document to a box, and the output destination of a document in a box. As the input source of an operation instruction for a box, there are a local UI (that is, the display device 107) and an apparatus on a network. An apparatus on a network communicates with the main controller 110 via any of the plurality of network interfaces 120. The input-source/output-destination determination unit 115 determines from which of the local UI and the plurality of network interfaces 120 the arriving operation instruction has been given. Similarly, the input-source/output-destination determination unit 115 determines, in response to input of a document to a box, which of the local scanner 101, the local fax machine 105 (fax reception), and the plurality of network interfaces 120 the input source is. On receipt of an instruction to output a document in a box, the input-source/output-destination determination unit 115 determines which of the local printer 103, the local fax machine 105 (fax transmission), and the plurality of network interfaces 120 the output destination is.

A box authentication unit 117 authenticates a user's access to a box, and performs authentication for input (saving) of an arriving document to a box. This authentication is performed using, for example, a password set to a box being operated or into which a document is to be input. That is, when a user tries to start operating a box, the user is asked to input a password. In the case where a correct password is input in response to this, the user is permitted to operate the box. In addition, on receipt of a fax addressed to a box, the document is permitted to be accumulated in the box in the case where a password accompanying the received document matches a password set to the box. In the case where an access control list is set to a box, a user authentication mechanism (not illustrated) performs user authentication on a user who is trying to operate the box, and the box authentication unit 117 permits a user identified by the user authentication to operate that box within a range permitted by the access control list of that box. For example, in the case where the user is permitted to accumulate and print a document in that box but is not permitted to transfer a document via fax or a network, a transfer instruction given from the user is not permitted. In the case where no password is set to the box and no access control is performed using an access control list, the user is permitted to perform all types of operations on that box (note that a later-described operation restriction in accordance with the input source/output destination of a document in the box related to an operation of interest is imposed on the user).

A management information memory 119 maintains management information used for controlling the input/output controller 113 with regard to input/output to/from a box. The maintained management information includes, for each box, box input/output information indicating whether input/output from/to each input source/output destination is permitted or not permitted. The box input/output information defines, for example, for each box, an input source from which input of an operation instruction or a document to that box is permitted, and an output destination to which output of a document in that box is permitted. In this case, input from an input source and output to an output destination whose permission is not defined in the box input/output information are not permitted. In addition, the box input/output information may define an input source and an output destination that are not permitted, instead of defining an input source and an output destination that are permitted. In this case, input from an input source and output to an output destination whose non-permission is not defined in the box input/output information are permitted. In addition, the box input/output information is not restricted to information that separately defines an input source and an output destination, and may be information that collectively defines permission or non-permission of both input and output to/from a box for a certain source (or network interface 120).

In addition, in terms of prevention of unintentional leakage of a document in a box, the case where it is not necessary to restrict input (saving) to a box is conceivable. In such a case, sometimes it is enough for the box input/output information to define the permitted output destination of a box (or the non-permitted output destination of a box). As in the above-mentioned example where the multifunctional peripheral 100 is connected to a plurality of networks with different security requirements, when a document from a network with strict security requirements is accumulated in a box that permits output to a network with lax security requirements, there is a risk of leakage to the latter network via that box. In such a case, the box input/output information additionally defines the input source.

In addition, the local (that is, not via a network) input/output of the multifunctional peripheral 100, that is, saving of a scanned or faxed document in a box, print out or fax transmission of a document in a box, are the basic functions of the multifunctional peripheral 100 and may be permitted by default. In a few specific examples described below, it is assumed that the local input/output to/from a box is permitted. In this case, the box input/output information defines permission or non-permission of input and output via each network interface 120.

The input/output controller 113 refers to management information such as box input/output information held in the management information memory 119, and controls input and output of a document to/from each box in the box memory 111.

Next, a process performed by the input/output controller 113 will be described using a specific example.

Figure 5:
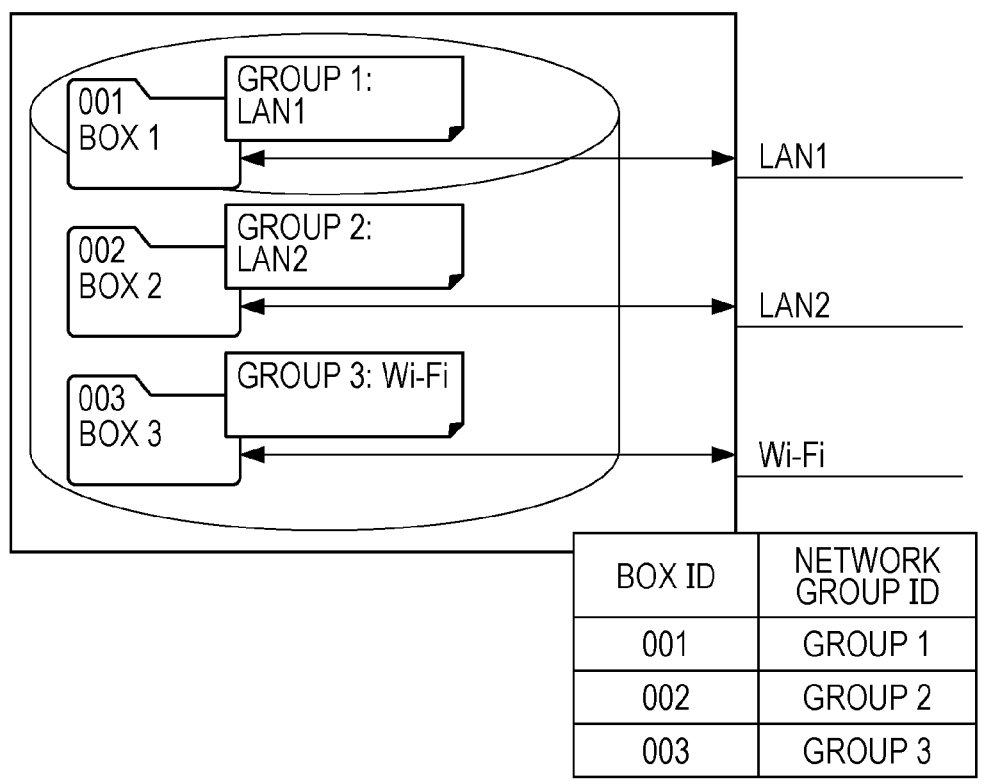
FIG. 5 is a diagram illustrating an example of box input/output information using the input/output path access authority information illustrated in FIG. 4.

FIGS. 4 and 5 illustrate input/output path access authority information and box input/output information held in the management information memory 119, which are used in one specific example. This example is an example in the case where the multifunctional peripheral 100 is connected to three networks, namely, LAN 1, LAN 2, and Wi-Fi illustrated in FIG. 1 (via three network interfaces 120 corresponding to these three networks).

The input/output path access authority information illustrated in FIG. 4 is information that defines a network group. This information includes a network group identification (ID) and network interface information corresponding to the network group ID. The network group ID is an ID for uniquely identifying a network group. The network interface information is a list of IDs of network interfaces constituting a network group with this network group ID. In the example illustrated in FIG. 4, "group 1" is constituted of only a network interface 120 that is namely "LAN 1" (and one or more networks connected to LAN 1); and "group 5" is constituted of two network interfaces 120 that are namely "LAN 1" and "Wi-Fi". This group information is used to represent a group permitted to input and output a document to/from a box in the box input/output information illustrated in the example in FIG. 5. Although it is stated that "group 4" has the value of network interface information as "none", this is used in the case where any input/output to/from a box via a network interface 120 is not permitted. In addition, "group 5" is used in the case where networks connected to "LAN 1" and "Wi-Fi" handle documents in accordance with similar security requirements. When this group is associated with a box, a document handled in (that is, saved in or output from) that box is restricted to one that is communicated using LAN 1 or Wi-Fi.

The box input/output information illustrated in FIG. 5 defines, for each box in the box memory 111, the ID of a network group permitted to input/output a document to/from that box. That is, in the example illustrated in FIGS. 4 and 5, a network interface 120 belonging to a network group associated with a box is permitted as a path for both input to and output from that box.

In the example illustrated in FIG. 5, a box named "box 1" (box ID is "001") is associated with group 1. Therefore, for this box 1, input/output via a network interface 120 with the ID "LAN 1" belonging to group 1 is permitted, but input/output via other network interfaces 120 is not permitted. That is, for box 1, the mode of permission of input/output of a document via a network is as follows:

1) Saving of a document via LAN 1 is permitted;
2) Saving of a document via LAN 2 or Wi-Fi is not permitted;
3) Output (Fetching and transfer) of a document via LAN 1 is permitted; and
4) Output of a document via LAN 2 or Wi-Fi is not permitted.

Because the local input/output is permitted by default in this example, saving of a scanned or fax-received document in box 1 is permitted, and output of a document in box 1 by means of printing or fax transmission is permitted.

As has been described above, the example illustrated in FIGS. 4 and 5 namely defines, for each box, a network permitted to use that box. In this example, one that is permitted to use a box via a network (that is, one that is permitted to operate the box, save a document in the box, fetch a document in the box, or be a transfer destination of that document) is restricted to an apparatus on a network belonging to a network group associated with that box. Therefore, each box in the multifunctional peripheral 100 shared by a plurality of networks may be separated for each network. In this example, for a document saved in a box locally (that is, from the scanner 101 or the fax machine 105), box input/output information of that box is applied when fetching that document from a remote computer or transferring that document to a remote computer. Therefore, leakage of a document saved locally in a box to an unintended network via that box is also prevented.

Next, referring to FIGS. 6 and 7, an example of a procedure executed by the input/output controller 113 will be described.

Figure 6:
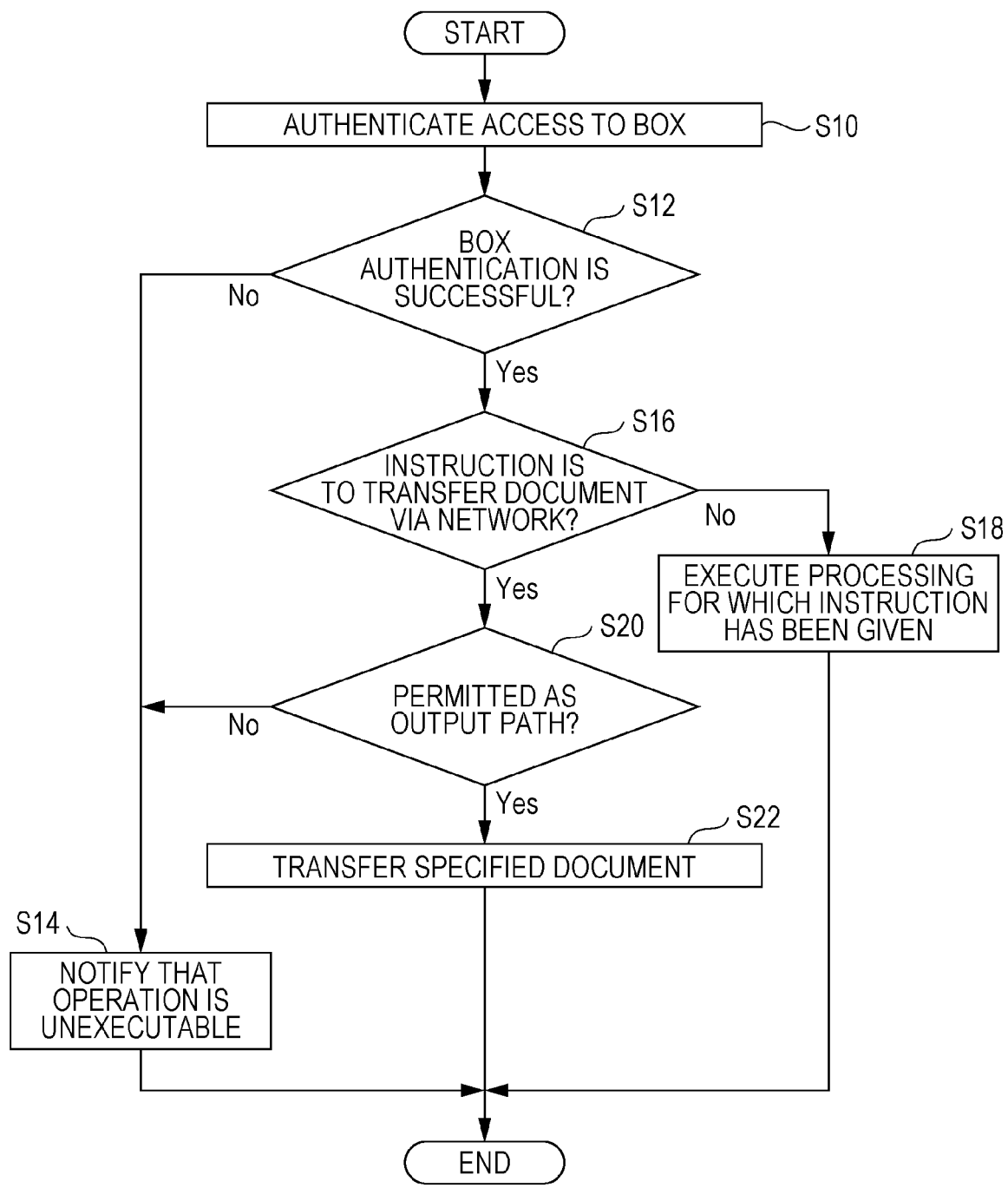
FIG. 6 is a flowchart illustrating an example of a procedure performed by an input/output controller in response to an instruction from a local user interface (UI) to the box.

FIG. 6 illustrates an example of a process executed by the input/output controller 113 in the case where a user specifies a box which is on a screen of a local UI (display device 107) as an operation target. In this case, the input/output controller 113 causes the box authentication unit 117 to perform access authentication processing on that box (S10). In the case where a password is set to that box, the box authentication unit 117 displays a password input screen on the UI and asks the user to input a password. When a password input by the user in response to this matches the password set to that box, the box authentication unit 117 regards that the authentication is successful. In addition, in the case of a method of controlling access to a box using an access control list based on user authentication, the box authentication unit 117 causes the user authentication mechanism (not illustrated) to perform login authentication of the user, and, when this login authentication is successful, obtains the user ID of that user from the user authentication mechanism. The box authentication unit 117 determines whether that user ID has any access right to that box (such as an authority to save or fetch a document in/from the box) using the access control list of the box. When the user has any access right to the box, the box authentication unit 117 determines that the authentication in step S10 is successful; and, when the user has no access right at all, the box authentication unit 117 determines that the authentication has failed. The input/output controller 113 determines whether the authentication performed by the box authentication unit 117 is successful or not (S12).

When the authentication performed by the box authentication unit 117 has failed, the input/output controller 113 displays an error screen indicating that an operation of the specified box is unexecutable on the local UI (S14), and ends the process.

When the authentication performed by the box authentication unit 117 is successful, the input/output controller 113 determines whether an instruction given by the user for that box is an instruction to perform an operation of transferring a document in that box via a network (S16). For example, the determination result in step S16 is yes when a transfer instruction using a network transfer protocol such as the File Transfer Protocol (FTP) or the Simple Mail Transfer Protocol (SMTP) has been given. In contrast, the determination result in step S16 is no when an instruction for an operation other than transfer via a network, such as print out or fax transmission of a document in the box, or saving of a scanned document in the box, has been given.

When the determination result in step S16 is no, the input/output controller 113 executes processing for which the instruction has been given by the user (S18). For example, in the case where the user has given an operation instruction to save a scanned document in that box, the input/output controller 113 receives a document generated by the scanner 101 and saves that document in the box in the box memory 111.

When the determination result in step S16 is yes, the input/output controller 113 causes the input-source/output-destination determination unit 115 to determine which network interface 120 the output path to the transfer destination of transfer (transmission) for which the user has given the instruction is. The input-source/output-destination determination unit 115 may perform this determination by, for example, determining which network connected to which network interface 120 has the address (such as the IP address) of the transfer destination. The input/output controller 113 refers to the management information memory 119 and determines whether the network interface 120 determined by the input-source/output-destination determination unit 115 is permitted as an output path of a document in that box in the box input/output information (S20). In the case of the example illustrated in FIGS. 4 and 5, the determination result in step S20 is yes when that network interface 120 is included in a network group associated with that box; and the determination result in step S20 is no when that network interface 120 is not included in that network group.

In the case where the determination result in step S20 is no, the input/output controller 113 displays an error screen indicating that the operation for which the instruction has been given is unexecutable on the local UI (S14), and ends the process.

In the case where the determination result in step S20 is yes, the input/output controller 113 transfers a document specified as a transfer target to the specified transfer destination (S22).

Figure 7:
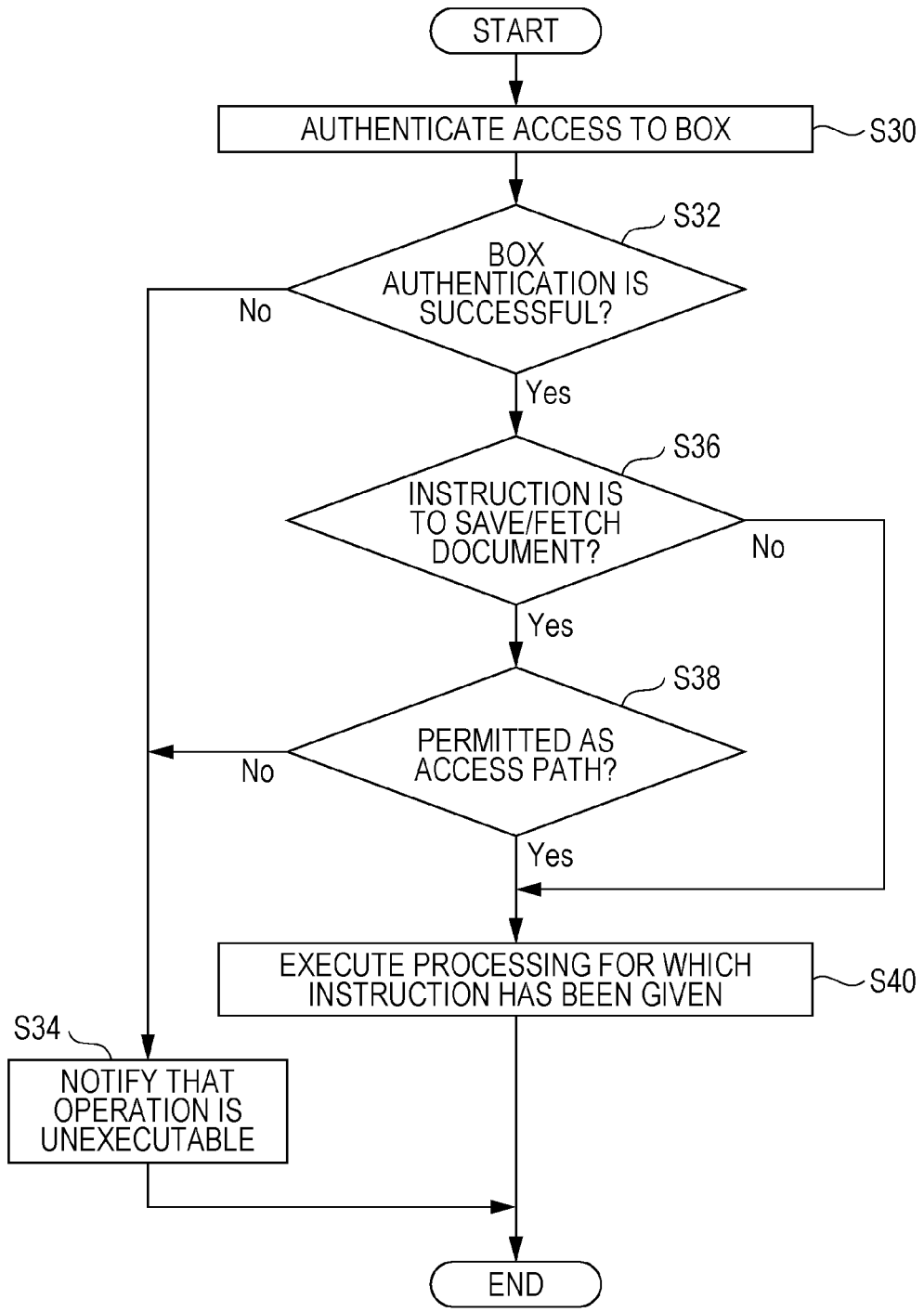
FIG. 7 is a flowchart illustrating an example of a procedure performed by the input/output controller in response to an instruction from a remote network to the box.

FIG. 7 illustrates an example of a process performed by the input/output controller 113 in the case where a user gives an instruction to perform an operation on a box from a remote computer connected via a network to the multifunctional peripheral 100. An operation on a box from a remote computer includes, for example, saving a document in the box (that is, uploading to the box from the remote computer), fetching a document in the box (downloading from the box to the remote computer), and displaying a screen for operating the box.

In this case, the input/output controller 113 causes the box authentication unit 117 to perform access authentication processing on that box (S30). In the case where the instruction from the remote computer is a document saving instruction addressed to that box, the box authentication unit 117 checks whether or not a password set to that box is included in the document saving instruction, and determines that the authentication is successful when the password is included in the document saving instruction, and that the authentication has failed when the password is not included in the document saving instruction. On receipt of a request given from a remote user to access a box, the box authentication unit 117 asks the user to input a password, and determines that the authentication is successful when the correct password is input in response to this. In the case of a method of controlling access to a box using an access control list, as in the case illustrated in FIG. 6, when the user authentication has been successful, the box authentication unit 117 obtains the user ID of the user who has been successfully authenticated from the user authentication mechanism, and determines whether the user ID has any access right to the box from the access control list of the box. When the user has any access right to the box, the box authentication unit 117 determines that the authentication in step S30 is successful.

When the authentication performed by the box authentication unit 117 has failed, the input/output controller 113 displays error information indicating that an operation on the specified box is unexecutable on the remote apparatus that has given the operation instruction (S34), and ends the process.

When the authentication performed by the box authentication unit 117 is successful, the input/output controller 113 determines whether the instruction given by the remote user for that box is an instruction to save (upload) a document in the box or to fetch (download) a document in the box (S36).

When the determination result in step S36 is no, the input/output controller 113 executes processing for which the instruction has been given by the user (S40). For example, when the user's instruction is an instruction to display an operation screen in that box, information on the operation screen is transmitted to that user's computer via a network.

When the determination result in step S36 is yes, the input/output controller 113 causes the input-source/output-destination determination unit 115 to determine which network interface 120 the path on which the remote user's instruction has been received is. The input/output controller 113 refers to the management information memory 119 and determines whether the network interface 120 determined by the input-source/output-destination determination unit 115 is permitted as an input or output path of a document in the box in the box input/output information (S38). In this determination, whether the determined network interface 120 is permitted as an input path is determined in the case of a document saving instruction; and whether the network interface 120 is permitted as an output path is determined in the case of a document fetching instruction. In the case of the example illustrated in FIGS. 4 and 5, because no distinction is made between input and output, the determination result in step S38 is yes when that network interface 120 is included in a network group associated with that box; and the determination result in step S38 is no when the network interface 120 is not included in that network group.

In the case where the determination result in step S38 is no, the input/output controller 113 returns error information indicating that the operation for which the instruction has been given is unexecutable to the remote user's computer (S34), and ends the process. In the case where the operation for which the instruction has been given is saving a document, a document received along with the instruction is discarded at this time. In the case where the determination result in step S38 is yes, the input/output controller 113 executes the operation for which the user has given the instruction, such as saving a document in the box or fetching a document in the box (S40).

In the procedure illustrated in FIG. 7, on receipt of an operation instruction for a box from a remote computer, whether an operation according to the instruction is permitted or not is determined from a combination of the instruction and a network where the computer is. However, this order of the instruction and determination is only one example. Instead of this order, when the user accesses a box in the multifunctional peripheral 100 from a remote computer, the input/output controller 113 may determine, for that computer, whether input or output of a document to/from the box is permitted, and may display that a non-permitted operation is in an unselectable state on the operation screen (that is, that operation is unselectable on the screen).

According to the process illustrated in FIG. 7, when a user accesses a box from a remote computer, if the computer is on a network that is not permitted to input or output a document to/from that box although the user has an access right to that box, no document is permitted to be saved in or fetched from that box. Even in this case, it may be permitted to perform operations on that box in a certain range except for saving or fetching of a document. In addition, in the case where a computer accessing a box is on a network that is not permitted to input or output a document to/from that box, even an operation screen of the box may not be permitted to be displayed.

Next, referring to FIGS. 8 and 9, another example of the box input/output information held in the management information memory 119 will be described.

Figures 8, 9, 10:
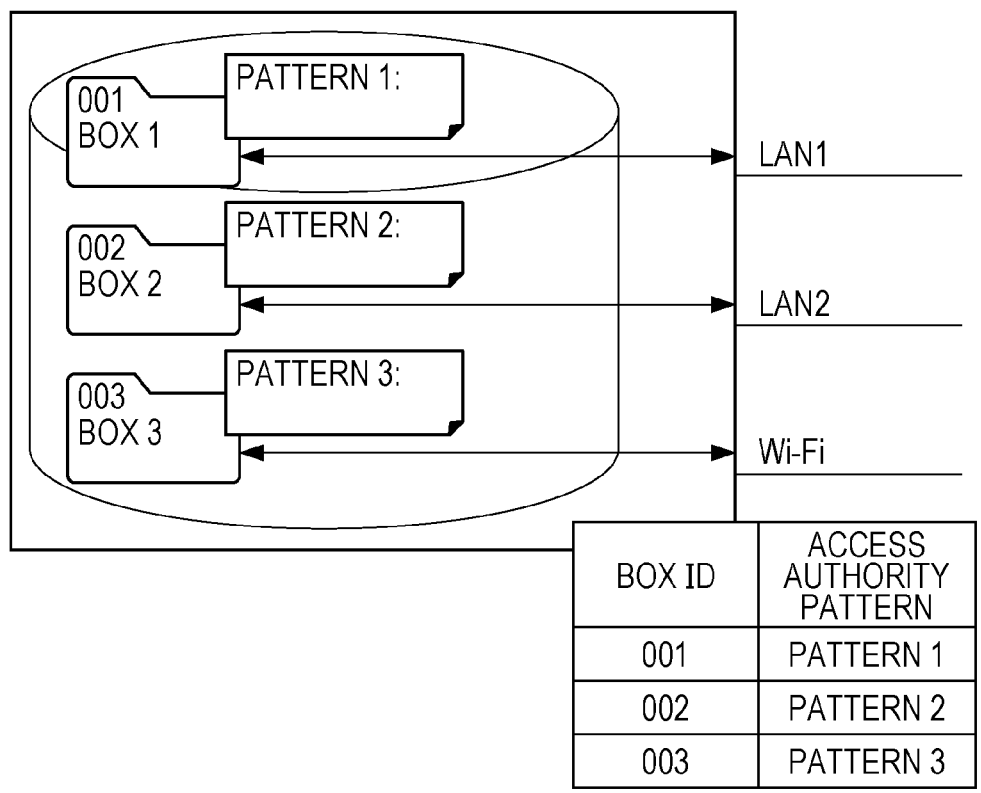
FIG. 8 is a diagram illustrating another example of the data structure of the input/output path access authority information.
FIG. 9 is a diagram illustrating an example of box input/output information using the input/output path access authority information illustrated in FIG. 8.
FIG. 10 is a diagram illustrating an example of the data structure of input/output path access authority information including an item of unspecified case information.

FIG. 8 is a diagram illustrating an example of the input/output path access authority information in this example. The input/output path access authority information is defined separately for the input path and the output path, unlike the example illustrated in FIG. 4. That is, the input/output access authority information in FIG. 8 defines one or more patterns of a combination of an input-permitted path and an output-permitted path. The input-permitted path is one or more network interfaces 120 permitted as the input path of a document to that box, and the output-permitted path is one or more network interfaces 120 permitted as the output path of a document in that box. For example, pattern 3 permits three network interfaces 120, namely, LAN 1, LAN 2, and Wi-Fi, as the input path to the box, but permits none of the network interfaces 120 as the output path ("none"). This means that a document in that box is not permitted to be output via a network at all.

The box input/output information illustrated in FIG. 9 defines, for each box in the box memory 111, the pattern ID of input/output access authority information set to that box.

In the example illustrated in FIG. 9, box 1 (box ID is "001") is associated with pattern 1. Therefore, for this box 1, input (saving) of a document via two network interfaces 120, namely, LAN 1 and Wi-Fi, and output of a document via LAN 1 are permitted. Therefore, in the case of the multifunctional peripheral 100 connected to LAN 1, LAN 2, and Wi-Fi illustrated in FIG. 1, for box 1, the mode of permission of input/output of a document via a network is as follows:

1) Saving of a document via LAN 1 or Wi-Fi is permitted;
2) Saving of a document via LAN 2 is not permitted;
3) Output (Fetching and transfer) of a document via LAN 1 is permitted; and
4) Output of a document via LAN 2 or Wi-Fi is not permitted.

Pattern 1 associated with this box 1 indicates that, for example, networks to which LAN 1 and Wi-Fi are connected handle documents requested to have similar security requirements. Pattern 1 is advantageous in the case where LAN 1 is more secure as a network than Wi-Fi. That is, since input of a document to box 1 is a one-time event for this document, the risk of leakage is small even when input from both LAN 1 and Wi-Fi is permitted; however, because output of a document is performed many times for this one document, the risk of leakage is reduced by permitting only LAN 1, which is expected to have a lower risk of leakage than Wi-Fi.

In addition, in the case of box 3 to which pattern 3 is set, the mode of permission of input/output of a document via a network is as follows:

1) Saving of a document via LAN 1, LAN 2, or Wi-Fi is permitted; and
2) Output (Fetching and transfer) of a document via LAN 1, LAN 2, or Wi-Fi is not permitted.

Although all of the patterns illustrated in FIG. 8 have only one network interface 120 specified as the output-permitted path, a plurality of network interfaces 120 may be set as the output-permitted path.

The control procedure performed by the input/output controller 113 on the basis of the input/output path access authority information and the box input/output information illustrated in FIGS. 8 and 9 may be the same as the procedures illustrated in FIGS. 6 and 7.

Next, an example of output control of a document in a box using unspecified case information will be described.

There is a case where a plurality of network interfaces 120 permitted as a document output path are set to a box. For example, when there is a box to which group 5 illustrated in FIG. 4 is set, this box corresponds to this case. In the case of transferring a document in such a box via a network, the document may be transferred to a transfer destination using any of the plurality of network interfaces 120 set as the output path. In this case, if a user who gives a transfer instruction does not explicitly specify the network interface 120 serving as the path for transferring that document, that document is transferred via one of the plurality of network interfaces 120 selected by the operating system. However, although a plurality of network interfaces 120 set to a box as a path permitted to output a document are connected to the same network, as in the above-mentioned relationship of LAN 1 and Wi-Fi, one of the network interfaces 120 may be better than the other(s) in terms of the risk of leakage of transferred data. In this case, a network interface 120 selected by the operating system from the plurality of network interfaces 120 is not necessarily one that is better in terms of the risk of leakage.

So far, the case where the user does not specify the network interface 120 serving as the path of document transfer has been described by way of example. For example, in the case of applying a processing flow including document transfer (such as the specification disclosed in Japanese Unexamined Patent Application Publication No. 2013-138284) to a box, the processing flow often describes the name, address, and the like of the transfer destination apparatus, but does not define the network interface via which the document is transferred. Therefore, a similar situation may occur in the case of applying the processing flow to a box.

To prevent such a situation, unspecified case information may be set to a box in this example. The unspecified case information defines, in the case of transferring a document in a box via a network, the network interface 120 to be used as the output path when the network interface 120 serving as the output path is not explicitly defined by the user, processing flow, or the like.

FIG. 10 illustrates an example where an item of unspecified case information is added to the input/output path access authority information illustrated in FIG. 4. The network interface 120 indicated in the item of unspecified case information is selected from one or more network interfaces 120 indicated in the item of network interface information. In the illustrated example, a box where group 6 is set is permitted to do document saving and fetching/transfer via LAN 1 and Wi-Fi. In the case where the network interface 120 via which a document in the box is transferred is not specified by the user or the like in an instruction to transfer the document, the input/output controller 113 selects LAN 1, which is defined in the unspecified case information, as the path used in the transfer according to the instruction.

With such control, when the network interface 120 serving as the path for transferring a document in a box is not explicitly specified, a network interface 120 that is inferior in terms of leakage or the like is prevented from being selected as the path by the operating system.

In the above exemplary embodiment and its modifications, in the case where the network interface 120 via which a document in a box is transferred, which is explicitly specified by the user, is not permitted as the output path in the box input/output information of that box, the input/output controller 113 does not execute that transfer, and responds to the user that the transfer is unexecutable.

Although FIG. 10 illustrates the input/output path access authority information illustrated in FIG. 4 with the addition of the item of unspecified case information, the input/output path access authority information illustrated in FIG. 8 with the addition of the item of unspecified case information may also be used.

Process in Response to Instruction to Change Box Input/Output Information

In the case where the user of a box changes his/her division or the network configuration is changed, there is sometimes a demand to change the box input/output information. However, when the box input/output information is carelessly changed according to that demand, a document that has been present in the box before the change may be leaked to a network different from one expected when the document was saved in the box. This may be a type of leakage risk for that document. Therefore, an example of reducing such a leakage risk will be described below.

Figures 11, 12:
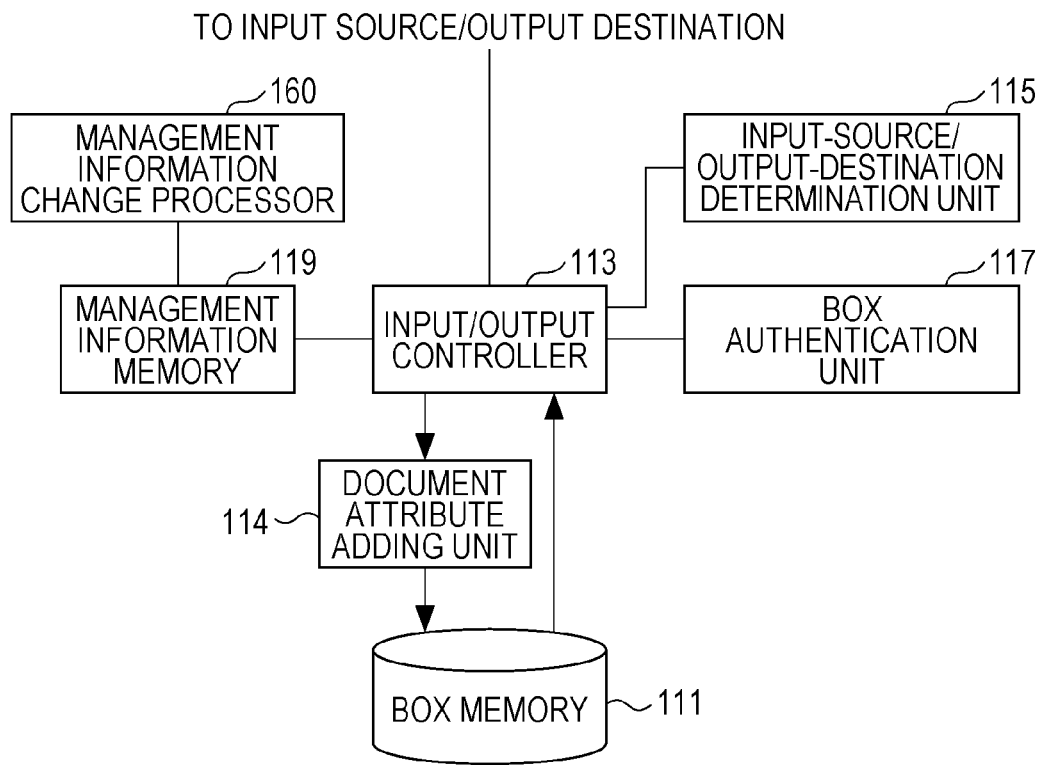
FIG. 11 is a diagram illustrating an example of the configuration of the apparatus according to the exemplary embodiment which includes a notification unit.
FIG. 12 is a diagram illustrating an example of attribute information of a document.

As illustrated in FIG. 11, the main controller 110 of the multifunctional peripheral 100 in this example includes a document attribute adding unit 114 and a management information change processor 160 in addition to the function modules illustrated in FIG. 3.

The document attribute adding unit 114 adds attribute information to a document saved in a box in the box memory 111. The box memory 111 holds attribute information of each document in each box in association with that document. FIG. 12 illustrates an example of a list of items of attribute information of documents in a certain box. As illustrated in FIG. 12, attribute information of each document includes a network input flag and an importance flag added by the document attribute adding unit 114.

The network input flag is binary data (the binary values are "ON" and "OFF" in the following description by way of example) indicating whether the input path when that document was saved in the box is via a network (that is, via any of the network interfaces 120). As has been described above, the input path of a document to a box includes the scanner 101 and the fax machine 105 (received as a faxed document), besides a network. In the case where a document scanned by the scanner 101 or a document received by the fax machine 105 is saved in a box, the document attribute adding unit 114 sets the value of the network input flag corresponding to the ID of that document to "OFF". For a document received via any of the network interfaces 120, the value of the network input flag is set to "ON".

The importance flag is binary data indicating whether or not the document is an important document. The fact that the document is "important" in the context of this example means that it is required to secure certain confidentiality for the document. More specifically, an "important" document requires prevention of leakage to a network other than the output destination network expected when the document was saved in a box. Whether a document to be saved in a box is "important" or not is specified by, for example, a user who saves that document in the box. In another example, when the details of an input document (such as the body text or annotations added to the body text) include a certain character string (such as "confidential") indicating that the document is "important" or certain annotation data (such as the stamp "confidential"), the document may be determined to be "important", and otherwise, the document may be determined to be not important. This determination is made by the document attribute adding unit 114. In the case where the saved document is image data, the document attribute adding unit 114 conducts character recognition on the image data using optical character recognition technology, and then makes a determination.

Referring back to the description of FIG. 11, the management information change processor 160 receives from a user a change instruction for the attribute information of a box, such as the box input/output information stored in the management information memory 119, and performs processing to change the attribute in response to the instruction.

On receipt of a change instruction from a user for the attribute information, particularly the box input/output information, of a box, the management information change processor 160 changes the attribute information in accordance with the instruction, thereby performing processing to prevent leakage of the document in the box to an unexpected network.

Figure 13:
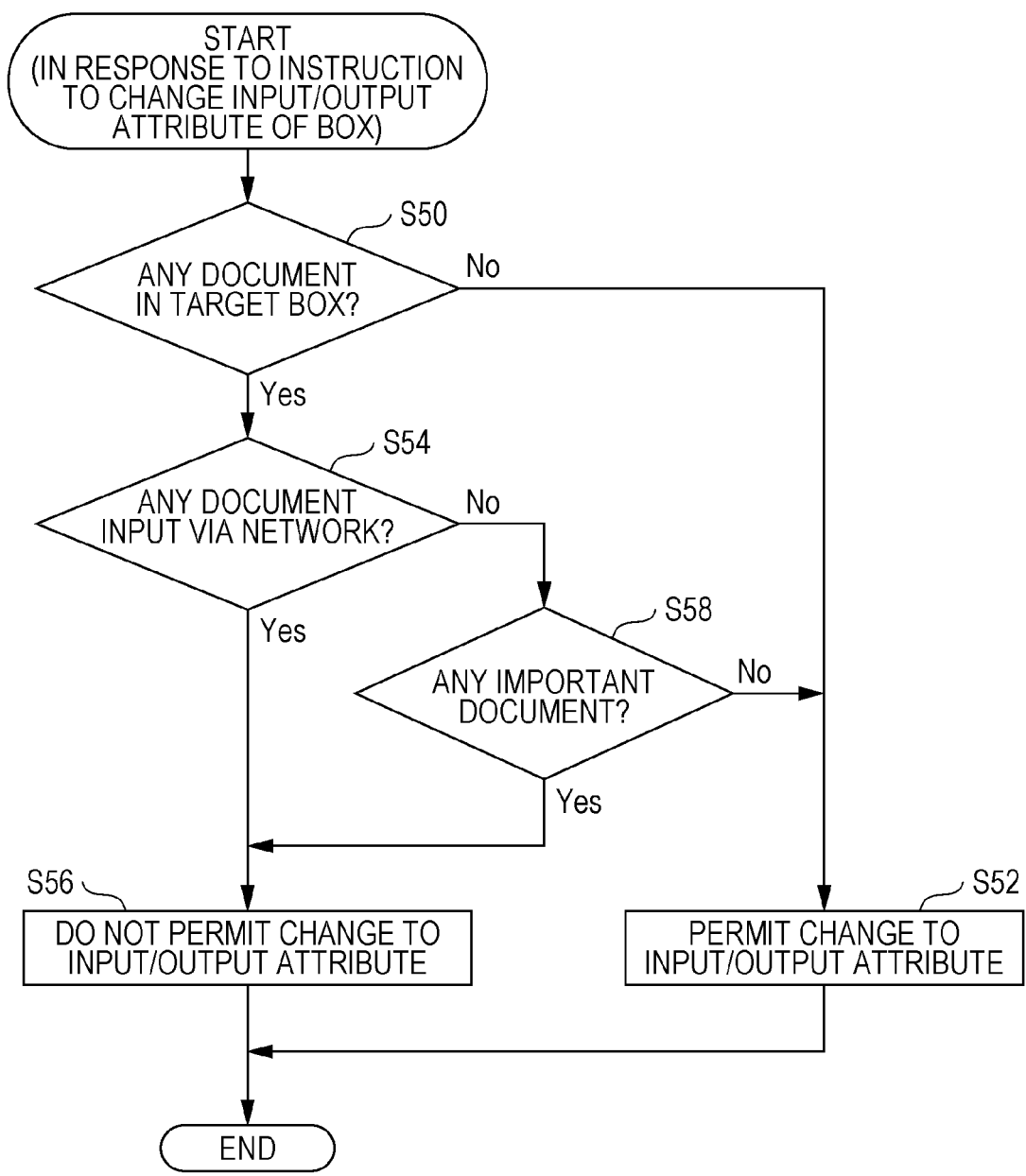
FIG. 13 is a flowchart illustrating an example of a procedure performed by a management information change processor.

FIG. 13 illustrates a procedure executed by the management information change processor 160. This procedure is executed when a user gives an instruction to start an operation to change the input/output attribute (that is, the box input/output information) of a certain box.

In this procedure, at first, the management information change processor 160 checks whether or not there is a document saved in a box specified to be changed (S50). In the case where there is no document in the box, the management information change processor 160 permits a change to the input/output attribute of the box (S52). In this case, the management information change processor 160 provides, for example, a screen for changing the input/output attribute of the box, and receives from the user an operation to change the input/output attribute.

When the determination result in step S50 is yes (that is, when there is a document(s) in the target box), the management information change processor 160 checks the attribute information of each document in that box (see FIG. 12), and determines whether there is a document that has been input via a network, that is, a document whose network input flag is "ON" (S54). When the determination result in step S54 is yes, the management information change processor 160 does not permit a change to the input/output attribute of that box (S56). In this case, because there is a document that requires confidentiality in the target box, the management information change processor 160 displays a message indicating that changing of the input/output attribute is unexecutable (on the display device 107 of the multifunctional peripheral 100, for example). The user who saw the message examines the necessity of changing the input/output attribute of the box, and, when the user determines that it is necessary to change the input/output attribute, deals with this situation by, for example, moving the document(s) in the box to another storage area with administrative privileges, and then performs an operation to change the input/output attribute of that box.

In many cases, a document input via a network is a document file generated by an application such as spreadsheet software or word processor software. If such a document is leaked, information contained in the document is easily extracted and reused without authorization. To prevent leakage to an unexpected network, it is prohibited to change the input/output attribute of the box. In contrast, a scanned document or a fax-received document is image data, which means that the risk of unauthorized extraction or unauthorized use is lower than a file generated by application.

When the determination result in step S54 is no, the management information change processor 160 determines whether there is a document whose importance flag is "ON" in that box (S58). When the determination result in step S58 is yes, the management information change processor 160 does not permit a change to the input/output attribute of that box (S56). Since a document whose importance flag is "ON" requires high confidentiality, it is prohibited to change the input/output attribute of the box when there is such a document in the box.

When the determination result in step S58 is no, the management information change processor 160 permits a change to the input/output attribute of that box (S52). In this case, although there is a document(s) in the box, there is no "important" document that strongly requires prevention of being output to a network other than the output destination network expected at the time of saving the document, and it is therefore permitted to change the input/output attribute of the box.

In this manner, according to the procedure illustrated in FIG. 13, in the case where a box contains a document that strongly requires prevention of being output to a network other than the output destination network expected at the time of saving the document, it is prohibited to change the input/output attribute of the box. Therefore, the risk of a document being output to a network other than the output destination network expected at the time of saving the document becomes lower.

Next, referring to FIG. 14, another example of the procedure performed by the management information change processor 160 will be described. In this procedure, in the case where a box contains a document that strongly requires prevention of being output to a network other than the output destination network expected at the time of saving the document, attribute information indicating that transfer is prohibited is added to the document, and then a change to the input/output attribute of the box is permitted.

Figure 14:
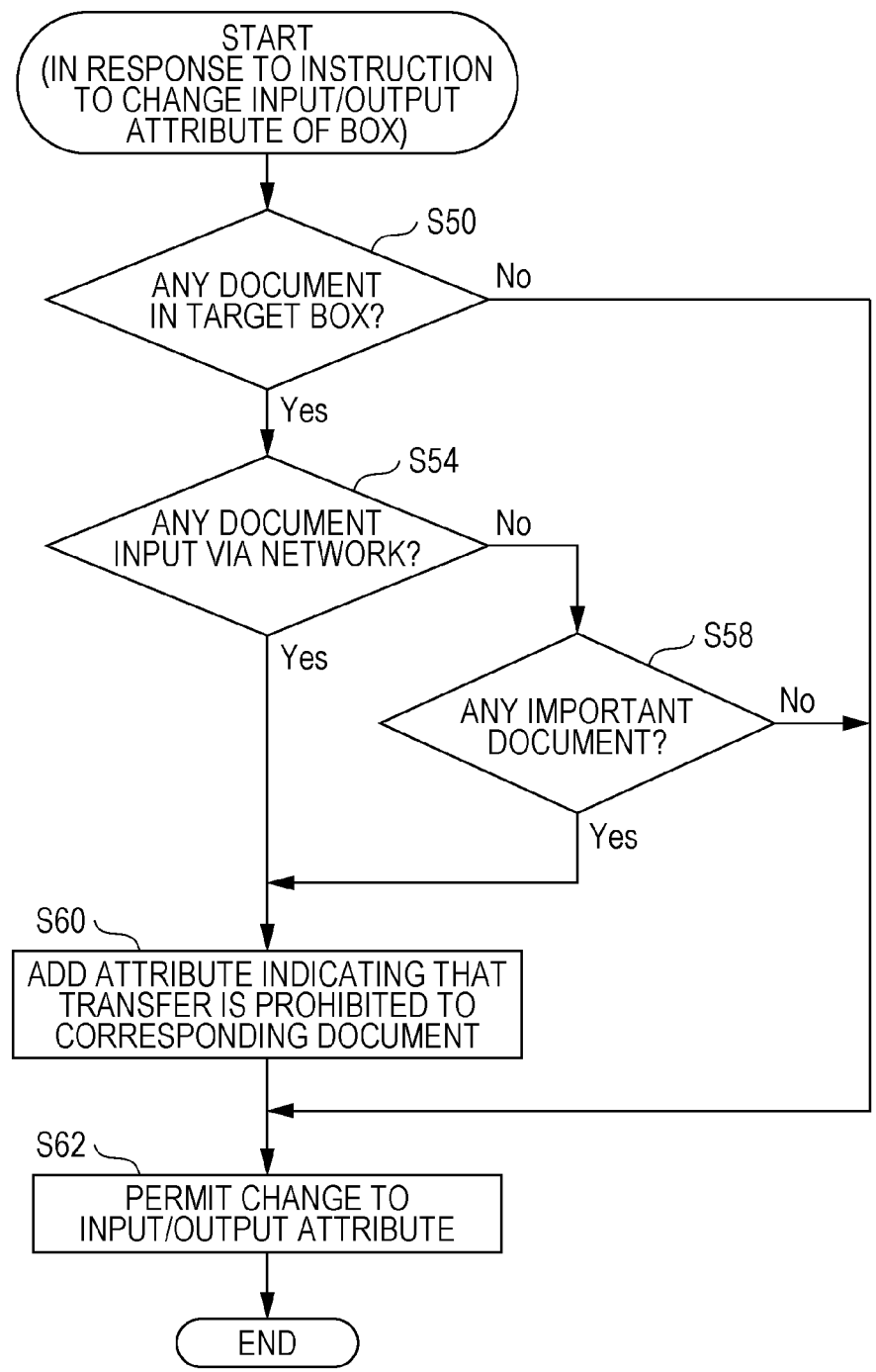
FIG. 14 is a flowchart illustrating another example of the procedure performed by the management information change processor.

In the procedure illustrated in FIG. 14, steps S50, S54, and S58 are the same as those with the same reference numerals in the procedure illustrated in FIG. 13. In addition, in the case where there is no document in the target box (the determination result in step S50 is no), and in the case where there is no document input via a network and no document whose importance flag is set to "ON" in the target box (both the determination results in step S54 and S58 are no), a change to the input/output attribute of the box is permitted (S62), which is the same as the procedure illustrated in FIG. 13.

In the procedure illustrated in FIG. 14, when the determination result in step S54 or S58 is yes, the management information change processor 160 adds an attribute indicating that transfer is prohibited to a document input via a network or a document whose importance flag is set to "ON" in the box (S60). Then, a change to the input/output attribute of the box is permitted (S62).

On receipt of an instruction from a user to transfer a document in a box (a transfer instruction from a local UI) or to fetch a document in a box (a download instruction from a remote computer), the input/output controller 113 determines whether the attribute indicating that transfer is prohibited is set to that document. In the case where the attribute indicating that transfer is prohibited is set, the input/output controller 113 rejects the transfer or fetch instruction, and returns to the user a message indicating that transfer is prohibited. In the case where the attribute indicating that transfer is prohibited is not set, the input/output controller 113 determines whether transfer or fetching is permitted in accordance with the procedure illustrated in FIG. 6, 7, or the like.

Next, referring to FIG. 15, yet another example of the procedure performed by the management information change processor 160 will be described. In this procedure, in the case where a box contains a document that strongly requires prevention of being output to a network other than the output destination network expected at the time of saving the document, the document is moved to an evacuation box, and then a change to the input/output attribute of the box is permitted.

Figure 15:
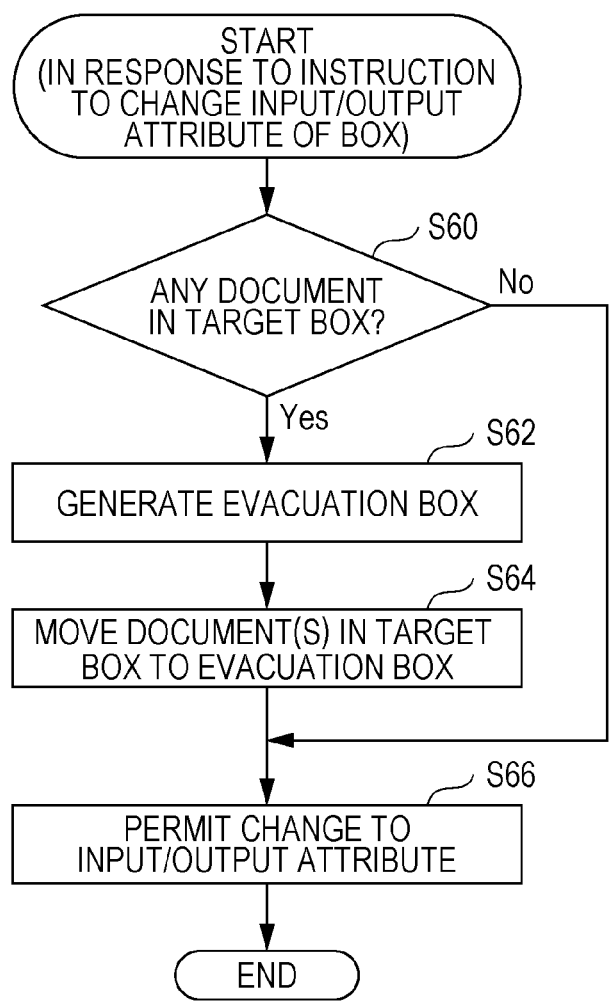
FIG. 15 is a flowchart illustrating yet another example of the procedure performed by the management information change processor.

That is, in the procedure illustrated in FIG. 15, on receipt of an instruction to change the box input/output information of a certain box, the management information change processor 160 determines whether there is a document in that box (S60). When the determination result is yes, the management information change processor 160 newly generates an evacuation box to which the input/output attribute indicating that the output (transfer or download) of a document via a network is prohibited is set (S62), and moves a group of document(s) in that box to the evacuation box (S64). Accordingly, there becomes no document in that box whose input/output attribute is to be changed. The management information change processor 160 permits a change to the input/output attribute of that box (S66). When the determination result in step S60 is no, like the procedure illustrated in FIG. 13, the management information change processor 160 permits a change to the input/output attribute of that box (S66).

Having moved the document(s) to the evacuation box, the management information change processor 160 may notify, via email or the like, the administrator of the box whose input/output attribute is to be changed of the fact that the document(s) has/have been evacuated. This notification may include information necessary for fetching the evacuated document(s), such as the identification name of the evacuation box and a password (if there is any) set to that box.

In the above example, the input/output attribute of the evacuation box is set such that the output (transfer or fetching) of a document via a network is prohibited. Alternatively, the input/output attribute of a box whose input/output attribute is to be changed may be copied to the evacuation box. In addition, instead of newly generating an evacuation box, a document(s) in a box whose input/output attribute is to be changed may be moved to an existing evacuation box with the setting that the output of a document via a network is prohibited.

In the above example, the management information change processor 160 determines whether to permit a change operation on the basis of the state of a box, that is, whether or not a box contains a document that strongly requires prevention of being output to a network other than the output destination network expected at the time of saving the document, regardless of the details of a change to the input/output attribute of the box. Alternatively, the determination may be made by taking into consideration the details of a change to the input/output attribute of the box. For example, the management information change processor 160 receives from a user an instruction to change the input/output attribute of a target box, and, when the input/ output attribute after the change according to the instruction prohibits the output (transfer or fetching) of a document from the box via a network interface 120, the management information change processor 160 permits the change. In contrast, when the input/output attribute after the change according to the instruction permits the output of a document from the box via any of the network interfaces 120, the management information change processor 160 prohibits the change.

In addition, the management information change processor 160 unconditionally permits a change in the case where one that has given an instruction to change the input/output attribute of a box is the administrator of the multifunctional peripheral 100.

The exemplary embodiment of the present disclosure has been described above. The main controller 110 of the multifunctional peripheral 100 illustrated by way of example above may be realized by, for example, causing a computer included in the multifunctional peripheral 100 to execute a program representing the functions of the functional modules in each apparatus. Here, the computer includes, as hardware, a circuit configuration in which a processor such as a central processing unit (CPU), memory (primary storage) such as random-access memory (RAM) and read-only memory (ROM), a hard disk drive (HDD) controller that controls an HDD, various input/output (I/O) interfaces, and a network interface that applies control for a connection with a network such as a local area network (LAN) are connected via a bus. In addition, for example, a disk drive for reading and/or writing data from/to a portable disk recording medium such as a compact disc (CD) or a digital versatile disc (DVD) via an I/O interface, and a memory reader/writer for reading/writing data from/to portable non-volatile recording media of various standards, such as flash memory, may be connected to the bus. In addition, a program describing the processing details of the functional modules illustrated above by way of example is saved in a fixed storage device such as an HDD via a recording medium such as a CD or a DVD or via communication means such as a network, and installed in the computer. The program stored in the fixed storage device is read out to the RAM and executed by a processor such as the CPU, thereby realizing the above-illustrated function module group.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a plurality of network interfaces;
    a storage area that saves data, in which an attribute defining a network interface permitted as an output path of the saved data is associated with the storage area; and
    a change controller that controls a change of the attribute corresponding to a change instruction to change the attribute, in accordance with a state regarding presence/absence of data in the storage area at a time point of receiving the change instruction.

2. The information processing apparatus according to claim 1, wherein the change controller does not execute a change of the attribute corresponding to the change instruction in a case where the state satisfies a certain condition.

3. The information processing apparatus according to claim 2, wherein, in a case where the change instruction is an instruction to change the attribute to indicate that none of the plurality of network interfaces is permitted as the output path, even in a case where the state satisfies the certain condition, a change of the attribute corresponding to the change instruction is executed.

4. The information processing apparatus according to claim 1, wherein, in a case where the state satisfies a certain condition, the change controller prohibits transfer of data that is present in the storage area at a time point of receiving the change instruction, and then executes a change of the attribute corresponding to the change instruction.

5. The information processing apparatus according to claim 1, wherein, in a case where the state satisfies a certain condition, the change controller evacuates data that is present in the storage area at a time point of receiving the change instruction to a second storage area, and then executes a change of the attribute corresponding to the change instruction.

6. The information processing apparatus according to claim 5, wherein, in a case where the state satisfies a certain condition, the change controller newly generates, as the second storage area, a storage area with an attribute indicating that none of the plurality of network interfaces is permitted as the output path or an attribute identical to the attribute associated with the storage area, and evacuates data in the storage area to the second storage area.

7. The information processing apparatus according to claim 2, wherein:
    the state is a state indicating whether or not there is data saved in the storage area at a time point of receiving the change instruction, and
    the certain condition states that there is data in the storage area at a time point of receiving the change instruction.

8. The information processing apparatus according to claim 2, further comprising:
    memory that stores, for each item of data saved in the storage area, whether or not the data has been input via any of the plurality of network interfaces, wherein:
    the state is a state indicating whether or not there is, in the storage area, data that has been input via any of the network interfaces at a time point of receiving the change instruction, and
    the certain condition states that there is, in the storage area, data that has been input via any of the plurality of network interfaces at a time point of receiving the change instruction.

9. The information processing apparatus according to claim 2, wherein:
    the state is a state indicating whether or not there is, in the storage area, data that satisfies a predetermined important data condition at a time point of receiving the change instruction, and
    the certain condition states that there is, in the storage, area, data that satisfies the important data condition at a time point of receiving the change instruction.

10. The information processing apparatus according to claim 1, wherein the change controller changes the attribute in accordance with the change instruction in a case where a person who has given the change instruction is an administrator of the information processing apparatus.

11. A non-transitory computer readable medium storing a program causing a computer with a plurality of network interfaces to execute a process, the process comprising:
   saving data in a storage area to which an attribute defining a network interface permitted as an output path of the saved data is associated; and
   controlling a change of the attribute corresponding to a change instruction to change the attribute, in accordance with a state regarding presence/absence of data in the storage area at a time point of receiving the change instruction.

12. An information processing apparatus comprising:
   network interface means;
   storage means for saving data, in which an attribute defining a network interface permitted as an output path of the saved data is associated with the storage means; and
   change control means for controlling a change of the attribute corresponding to a change instruction to change the attribute, in accordance with a state regarding presence/absence of data in the storage means at a time point of receiving the change instruction.

* * * * *